2,539,039

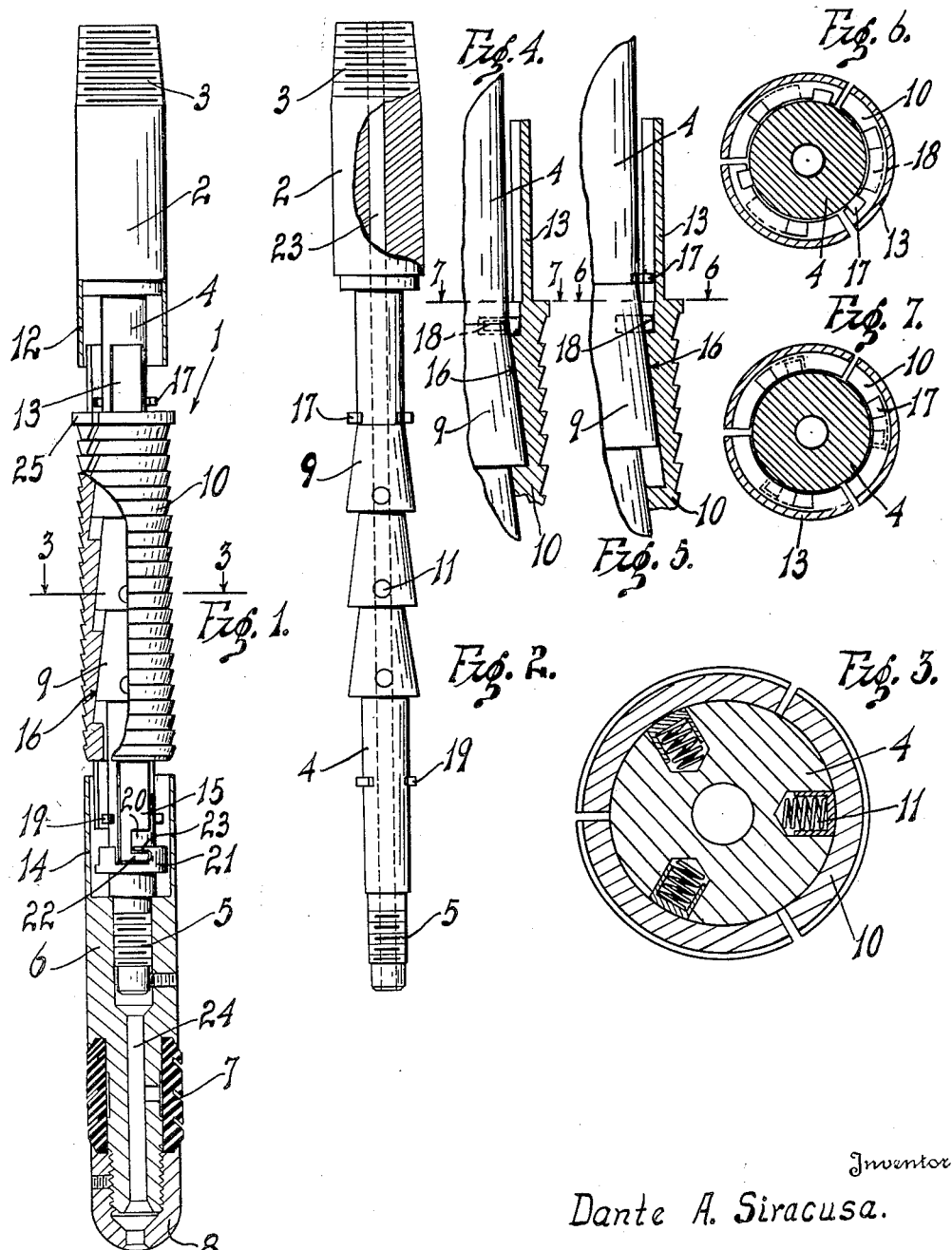
Jan. 23, 1951 — D. A. SIRACUSA — 2,539,039
OIL WELL FISHING SPEAR
Filed June 24, 1947
Inventor
Dante A. Siracusa.
By H. A. Duckman
Attorney Patented Jan. 23, 1951

UNITED STATES PATENT OFFICE 2,539,039

OIL WELL FISHING SPEAR

Dante A. Siracusa, Huntington Beach, Calif.

Application June 24, 1947, Serial No. 756,617

9 Claims. (Cl. 294—94)

This invention relates to an oil well fishing tool, commonly termed a spear, whereby lost or broken sections of pipe can be recovered from the well. If the fish cannot be removed the spear can be readily released and withdrawn from the well. The tool is run into the well and the toothed members of the tool fit on the inside of the lost or broken pipe (commonly termed a fish) and are then expanded against the inside of the fish, and by exerting an upward pull, the fish is loosened and brought to the surface.

An object of my invention is to provide a novel fishing tool of the character stated in which the toothed or serrated pipe engaging members are so constructed and arranged that the lost pipe or fish is engaged throughout very nearly three hundred sixty degrees of the inner surface thereof.

Another object of my invention is to provide a novel fishing tool of the character stated in which one or more of the toothed slips may be quickly and easily removed and replaced when necessary.

A feature of my invention resides in the novel means whereby each member of the slip assembly is yieldably pressed outwardly so as to frictionally engage the inside of the lost pipe, and enables the body to be removed relative to the slips.

Another object of my invention is to provide a novel fishing tool of the character stated in which a slip hanger or cage commonly used in tools of this type heretofore in use, is eliminated in my tool, thereby simplifying the tool construction and providing a substantially continuous gripping surface to engage the inside of the lost pipe.

Another feature of my invention is to provide a novel means to support the slips in their retracted position, said supporting means being readily releasable when it is desired to expand the slips to engage the fish, and said supporting means being readily engageable when it is desired to retract the slips and release from a fish.

Another feature of my invention is to provide a novel means to couple the various slips so that they will move vertically as a unit.

Other objects, advantages and features of my invention may appear from the accompanying drawing, the subjoined detailed description and the appended claims.

In the drawing—

Figure 1 is a side elevation of my oil well fishing spear.

Figure 2 is a side elevation of the mandrel, with parts broken away to show the interior bore.

Figure 3 is an enlarged sectional view taken on line 3—3 of Figure 1.

Figure 4 is a fragmentary vertical sectional view of the upper part of the slip and mandrel.

Figure 5 is a fragmentary sectional view similar to Figure 4, but showing the slips in released position.

Figure 6 is a sectional view taken on line 6—6 of Figure 5.

Figure 7 is a sectional view taken on line 7—7 of Figure 4.

Referring more particularly to the drawing, my fishing spear 1 comprises a body 2 which screws on to, or into a string of pipe upon which the tool is run. The body 2 is threaded as shown at 3 to receive this pipe. A mandrel 4 depends from the body 2 and is threaded at the lower end as shown at 5, to screw into a nut 6. This nut carries an annular packing 7, the packing being held in position by the tail nut 8, which screws on to the bottom of the nut 6. The mandrel 4 is formed with a plurality of superimposed tapered seats 9, the purpose of these seats being to cam the slips outwardly, as will be further described.

A plurality of slips 10 surround the mandrel 4 and rest on the seats 9. These slips are each formed with external teeth or wickers, all of which is usual and well known in the art. Mounted in the mandrel 4 are a plurality of spring dents 11 which engage the inner surface of the slips 10, and press these slips outwardly, particularly when the slips are retracted. The purpose of these springs is to yieldably press the slips outwardly so that when the tool is dropped into the lost pipe or fish the slips will be pressed into engagement with the inner surface of the lost pipe, and will be held stationary with a frictional grip, thus permitting the remainder of the tool to move vertically and to rotate relative to the slips, for a purpose to be further described.

The body 2 is provided with a depending annular apron 12 and each of the slips 10 is provided with a blade 13 which extends upwardly under the apron 12, and serves to guide or retain the upper part of the slips and prevent them from falling outwardly before the tool has been inserted in the lost pipe. Similarly, the nut 6 is provided with an upwardly extending apron 14 and each of the slips 10 is provided with a downwardly extending blade 15 which extends into the apron 14, and holds the lower end of the slips from accidently moving outwardly while the tool is being moved into the well. Each of the slips 10 is also formed with complementary camming surfaces to the cam surfaces 9 as shown at 16, and this again is usual and well known in the art.

When the tool is run into the well, it is necessary that the slips 10 move to a raised position at which point they are compressed to a minimum diameter, so that the tool can be inserted into the lost pipe. When the slips contact the fish, they will be pushed upwardly, due to their frictional engagement with the inside of the lost pipe or fish. To hold the slips in this raised position, I provide lugs 17 on the mandrel 4, these lugs project outwardly and there is one lug for each slip. The slips are each provided with a bayonet groove 18, into which the lug 17 may be moved, thus holding the slips 10 in their raised position. Adjacent the lower end of the mandrel, similar lugs 19 are provided and these lugs may be moved into a notch 20 in the blades 15, thus the lower end of the slips are also retained in their proper position. When the lugs 17 and 19 engage the slips, said slips are held in raised position and the tool can be released from the fish and returned to the surface.

To cause the slips 10 to move in unison, I may provide a collar 21, and each of the blades 15 is formed with a finger 22 which fits in a slot 23 in the collar. The collar is free to move around the mandrel 4, thus following the slips 10 in their movement and causing them to move in unison. The mandrel 4 and body 2 is provided with a longitudinal bore 23, and the nut 6 is provided with a central bore 24, so that circulation can be maintained through the tool and into the fish during the fishing operation. The packer 7 causes the circulating fluid to pass downwardly through the fish so as to loosen the fish or lost pipe from the formation surrounding it.

In operation, my tool may be lowered into the well with the slips 10 in raised position, that is, with the lugs 17 fitting in the grooves 18, and the lugs 19 fitting into the notches 20. The spring detents 11 press the slips outwardly and when the fish is reached, and the slips are forced into it, these spring detents will press the slips against the wall of the fish. With the slips thus frictionally held stationary, it is possible to rotate the mandrel 4 by rotating the pipe upon which it is mounted in a direction to release simultaneously the lugs 17 from the grooves 18, and the lugs 19 from the notches 20. The slips 10 are now free to move downwardly on the cam surfaces 9 and by pulling upwardly on the mandrel 4, the slips are cammed outwardly against the inner surface of the lost pipe and the teeth or wickers will bite into the pipe, thus providing a secure grip for the purpose of removing the pipe. If it is desired to release the spear from the fish, this can be accomplished by moving the mandrel 4 downwardly and rotating the mandrel 4 in a direction to engage simultaneously the lugs 17 in the grooves 18, and the lugs 19 in the notches 20, thereby suspending the slips in their raised position, and permitting removal of the tool, or disengagement of the tool from the pipe.

My slip assembly is so arranged as will be evident from the drawings, that substantially three hundred sixty degree engagement of the slips and pipe is accomplished. Not only is the entire circumference of the inner surface of the pipe engaged, but also the entire length of the slips 10, thus providing a large and effective engaging surface, which will not slip under strain, and thus will effectively remove the lost pipe. It will be noted that I do not provide a slip hanger nor spring fingers, between the slips, all of which detract from the circumferential engaging surface of the slips. Furthermore, each of the slips 10 are backed up throughout substantially three hundred sixty degrees with the tapered cam surfaces 9, thus reducing the unit stress on the slips. A shoulder 25 may be formed on the upper end of each of the slips 10, this shoulder engaging the top of the fish, thus limiting the downward movement of the tool into the fish, and also insuring release of the tool from the fish.

Having described my invention, I claim:

1. An oil well fishing spear comprising a body, a mandrel depending from the body, tapered cam seats on the mandrel, a plurality of slips surrounding the mandrel and resting on the cam seats, each of said slips having a bayonet groove therein, and lugs on the mandrel, each engageable with a bayonet groove, a blade on the lower end of each of the slips, said blade having a notch formed therein, and a second lug on the mandrel cooperatively associated with the notch on each blade.

2. An oil well fishing spear comprising a body, a mandrel depending from the body, tapered cam seats on the mandrel, a plurality of slips surrounding the mandrel and resting on the cam seats, each of said slips having a bayonet groove therein, and lugs on the mandrel, each engageable with a bayonet groove, an upwardly extending blade on each of the slips and an apron depending from said body, and extending over the blades, whereby the slips are held in position, a nut threaded on to the lower end of the mandrel, a blade depending from each of the slips, and an apron extending upwardly from the nut and extending over the depending blades to guide the lower end of the slips.

3. An oil well fishing spear comprising a body, a mandrel depending from the body, tapered cam seats on the mandrel, a plurality of slips surrounding the mandrel and resting on the cam seats, each of said slips having a bayonet groove therein, and lugs on the mandrel, each engageable with a bayonet groove, an upwardly extending blade on each of the slips and an apron depending from said body, and extending over the blades, whereby the slips are held in position, a nut threaded on to the lower end of the mandrel, a blade depending from each of the slips, and an apron extending upwardly from the nut and extending over the depending blades to guide the lower end of the slips, each blade having a notch formed therein, and a second lug on the mandrel cooperatively associated with the notch on each blade.

4. An oil well fishing spear comprising a body, a mandrel depending from the body, tapered cam seats on the mandrel, a plurality of slips surrounding the mandrel and resting on the cam seats, each of said slips having a bayonet groove therein, an upwardly extending blade on each of the slips and an apron depending from said body, and extending over the blades, whereby the slips are held in position, a nut threaded on to the lower end of the mandrel, a blade depending from each of the slips, and an apron extending upwardly from the nut and extending over the depending blades to guide the lower end of the slips, a ring slidably mounted on the mandrel and means releasably attaching each of the slips to said ring.

5. An oil well fishing spear comprising a body, a mandrel depending from the body, tapered cam seats on the mandrel, a plurality of slips surrounding the mandrel and resting on the cam seats, each of said slips having a bayonet groove therein, an upwardly extending blade on each of the slips and an apron depending from said body, and extending over the blades, whereby the slips are held in position, a nut threaded on to the lower end of the mandrel, a blade depending from each of the slips, and an apron extending upwardly from the nut and extending over the depending blades to guide the lower end of the slips, a ring slidably mounted on the mandrel and means releasably attaching each of the slips to said ring, spring detents in the mandrel bearing against the slips to urge the slips outwardly.

6. An oil well fishing spear comprising a body, a mandrel depending from the body, tapered cam seats on the mandrel, a plurality of slips surrounding the mandrel and resting on the cam seats, each of said slips having a bayonet groove therein, and lugs on the mandrel, each engageable with a bayonet groove, a blade on the lower end of each of the slips, said blade having a notch formed therein and a second lug on the mandrel cooperatively associated with the notch on each blade, a ring slidably mounted on the mandrel adjacent the slips and means on the slips releasably attaching each of the slips to said ring.

7. An oil well fishing spear comprising a body, a mandrel depending from the body, a plurality of tapered cam seats on the mandrel, a slip mounted on each of the seats, said mandrel having a hole in each of the cam seats, a button mounted in each of the holes and a spring bearing against the button and urging the same against the slip whereby the slip is pressed outwardly, and releasable means engaging each of the slips to releasably hold the slips to raised position.

8. An oil well fishing spear comprising a body, a mandrel depending from the body, a plurality of tapered cam seats on the mandrel, a slip mounted on each of the cam seats, a button mounted in each of the holes and a spring bearing against the button and urging the same against the slip whereby the slip is pressed outwardly, and releasable means engaging each of the slips to releasably hold the slips in raised position, an upwardly extending blade on the top of each of the slips, a downwardly extending blade on the bottom of each of the slips, an apron depending from the body and extending over the upper blades, and a second apron extending over the lower blades.

9. An oil well fishing spear comprising a body, a mandrel depending from the body, a plurality of tapered cam seats on the mandrel, a slip mounted on each of the cam seats, a button mounted in each of the holes and a spring bearing against the button and urging the same against the slip whereby the slip is pressed outwardly, and releasable means engaging each of the slips to releasably hold the slips in raised position, said releasable means comprising lugs on the mandrel, each of said slips having a bayonet groove therein, each of said lugs engaging a bayonet groove, whereby the slips are held in elevated position.

DANTE A. SIRACUSA.

REFERENCES CITED

The following references are of record in the file of this patent:

UNITED STATES PATENTS

| Number | Name | Date |
|---|---|---|
| 1,776,737 | Miller | Sept. 23, 1930 |
| 1,825,026 | Thomas | Sept. 29, 1931 |
| 2,009,164 | Colmerauer | July 23, 1935 |
| 2,075,248 | Wickersham et al. | Mar. 30, 1937 |